United States Patent
Peng et al.

(10) Patent No.: US 12,424,618 B2
(45) Date of Patent: Sep. 23, 2025

(54) LITHIUM-ION BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Chang Peng, Ningde (CN); Peipei Chen, Ningde (CN); Hailin Zou, Ningde (CN); Liye Li, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 533 days.

(21) Appl. No.: 17/953,327

(22) Filed: Sep. 27, 2022

(65) Prior Publication Data
US 2023/0084934 A1   Mar. 16, 2023

Related U.S. Application Data

(63) Continuation of application No. PCT/CN2021/115815, filed on Aug. 31, 2021.

(51) Int. Cl.
*H01M 4/36* (2006.01)
*H01M 4/62* (2006.01)
(Continued)

(52) U.S. Cl.
CPC .......... *H01M 4/366* (2013.01); *H01M 4/626* (2013.01); *H01M 10/0525* (2013.01); *H01M 10/0567* (2013.01)

(58) Field of Classification Search
None
See application file for complete search history.

(56) References Cited

U.S. PATENT DOCUMENTS

2002/0182490 A1* 12/2002 Cho .................... H01M 50/466
                                                      29/623.5
2009/0029240 A1*  1/2009 Gardner .............. H01M 50/538
                                                       429/211
(Continued)

FOREIGN PATENT DOCUMENTS

CN         104011927 B    11/2016
CN         107123812 A     9/2017
(Continued)

OTHER PUBLICATIONS

Extended European Search Report issued May 23, 2024 in European Patent Application No. 23210059.4.
(Continued)

*Primary Examiner* — Wyatt P McConnell
(74) *Attorney, Agent, or Firm* — XSENSUS LLP

(57) ABSTRACT

This application provides a lithium-ion battery, including: an electrode assembly and an electrolytic solution.
The lithium-ion battery may satisfy the following condition:

$0.6 \leq \alpha \leq 0.9$, and $4 \leq w \times \alpha/\beta 1 \leq 25$, where, $\alpha = La/Lc$, La is an arc length of a convex surface of the negative current collector corresponding to a concave surface of an innermost first circle of positive electrode in a jelly-roll structure of the electrode assembly, Lc is an arc length of a concave surface of an innermost first circle of positive current collector in the jelly-roll structure of the electrode assembly, and La and Lc are measured in mm; w is a percent of the first lithium salt $Li_xR_1(SO_2N)_xSO_2R_2$ by mass in the electrolytic solution; and $\beta 1$ is a thickness of the metallic conductive layer in the positive current collector, measured in μM.

12 Claims, 4 Drawing Sheets

(a)

(b)

(51) Int. Cl.
    *H01M 10/0525*    (2010.01)
    *H01M 10/0567*    (2010.01)

(56) References Cited

U.S. PATENT DOCUMENTS

| | | |
|---|---|---|
| 2021/0151770 A1 | 5/2021 | Liu et al. |
| 2022/0085384 A1 | 3/2022 | Liu et al. |

FOREIGN PATENT DOCUMENTS

| | | |
|---|---|---|
| CN | 110943227 A | 3/2020 |
| CN | 111180737 A | 5/2020 |
| CN | 111934027 A | 11/2020 |
| CN | 112186197 A | 1/2021 |
| JP | 5577405 B2 | 8/2014 |
| WO | 2021166925 A1 | 8/2021 |

OTHER PUBLICATIONS

International Search Report issued May 13, 2022 in corresponding International Patent Application No. PCT/CN2021/115815 (with English translation), 5 pages.

Written Opinion issued May 13, 2022 in corresponding International Patent Application No. PCT/CN2021/115815 (with English translation), 10 pages.

\* cited by examiner

LITHIUM-ION BATTERY, BATTERY MODULE, BATTERY PACK, AND ELECTRICAL DEVICE

CROSS-REFERENCE TO RELATED APPLICATION

The present application is a continuation of International Application No. PCT/CN2021/115815, filed Aug. 31, 2021, the entire content of which is incorporated herein by reference in its entirety.

TECHNICAL FIELD

This application relates to energy storage lithium-ion batteries, and in particular, to a lithium-ion battery with a high energy density, a battery module, a battery pack, and an electrical device.

BACKGROUND

Lithium-ion batteries have become the most popular energy storage systems by virtue of a high operating potential, longevity, and environmental friendliness, and have now been widely used in fields such as battery electric vehicles, hybrid electric vehicles, and smart grids. However, safety issues of the lithium-ion batteries have bottlenecked the application and popularization of the lithium-ion batteries to a great extent. Therefore, it is necessary to provide a high-safety lithium-ion battery design.

SUMMARY

Currently, typical structures of lithium-ion batteries are a stacked structure and a jelly-roll structure. The inventor hereof finds that, a jell-roll lithium-ion battery is prone to lithium plating on a convex surface of a negative electrode. Especially, the lithium plating is the severest on the convex surface of an innermost circle of negative electrode. In the jelly-roll structure, a length of a concave surface of a positive electrode is greater than a length of the corresponding convex surface of the negative electrode. Therefore, a negative electrode material can hardly accept all lithium migrated from the positive electrode during charging. Excess lithium is deposited in the form of lithium metal on the surface of the negative electrode, resulting in a phenomenon of lithium plating. Dendrites resulting from the lithium plating are much prone to pierce the separator to cause a problem of internal short circuits.

In addition, in a case of abnormal situations such as collision, extrusion, and puncture, a positive current collector is much prone to contact a negative current collector to cause internal short circuits in the battery. The short circuits lead to a surge of a temperature of a battery cell, and, when combined with the highly active lithium simple substance generated at a corner, are much prone to cause fire and explosion of the battery cell.

This application is a result of research targeted at the foregoing technical problems, and aims to provide a lithium-ion battery, a battery module, a battery pack, and an electrical device, so as to solve the problem of internal short circuits caused by lithium plating at the corner on the convex surface of the innermost cycle of negative electrode of the jelly-roll lithium-ion battery, and improve safety of the lithium-ion battery.

To achieve the foregoing objectives, one aspect of this application provides a lithium-ion battery, including: an electrode assembly and an electrolytic solution.

The electrode assembly includes a positive electrode plate and a negative electrode plate that are wound together, and a separator located between the positive electrode plate and the negative electrode plate, the negative electrode plate includes a negative current collector and a negative material layer disposed on at least one surface of the negative current collector, and the positive electrode plate includes a positive current collector and a positive material layer disposed on at least one surface of the positive current collector.

The positive current collector includes a support layer and a metallic conductive layer, and the metallic conductive layer is disposed on at least one of two surfaces of the support layer.

The electrolytic solution contains a first lithium salt $Li_xR_1(SO_2N)_xSO_2R_2$, where $R_1$ and $R_2$ each independently represent an alkyl with 1 to 20 fluorine atoms or carbon atoms, or a fluoroalkyl with 1 to 20 carbon atoms, or a fluoroalkoxyl with 1 to 20 carbon atoms, and x is an integer of 1, 2, or 3.

The lithium-ion battery satisfies the following condition:

$$0.6 \le \alpha \le 0.9, \text{ and } 4 \le w \times \alpha/\beta1 \le 25,$$

where, $\alpha = La/Lc$, La is an arc length of a convex surface of the negative current collector corresponding to a concave surface of an innermost first circle of positive electrode in a jelly-roll structure of the electrode assembly, Lc is an arc length of a concave surface of an innermost first circle of positive current collector in the jelly-roll structure of the electrode assembly, and La and Lc are measured in mm; w is a percent of the first lithium salt $Li_xR_1(SO_2N)_xSO_2R_2$ by mass in the electrolytic solution; and $\beta1$ is a thickness of the metallic conductive layer, measured in μm.

By satisfying the foregoing conditions, the lithium-ion battery according to this application can solve the problem of internal short circuits caused by lithium plating at the corner on the convex surface of the innermost cycle of negative electrode of the jelly-roll lithium-ion battery, and improve safety of the lithium-ion battery.

In this application, alternatively, the lithium-ion battery satisfies: $8.7 \le w \times \alpha/\beta1 \le 17$.

In the lithium-ion battery according to this application, alternatively, $0.52 \le \beta1 \le 2.4$, optionally $0.55 \le \beta1 \le 2.0$, and further optionally $0.8 \le \beta1 \le 1.3$.

In the lithium-ion battery according to this application, alternatively, $5 \le w \le 30$, optionally $6 \le w \le 25$, and further optionally $11 \le w \le 20$. 100151 In the lithium-ion battery according to this application, alternatively, the metallic conductive layer is disposed on both surfaces of the support layer.

In the lithium-ion battery according to this application, alternatively, the electrolytic solution further contains a second lithium salt, and the second lithium salt is at least one selected from $LiPF_6$, $LiAsF_6$, or $LiBF_4$.

In the lithium-ion battery according to this application, alternatively, in the electrolytic solution, a mass percent of the second lithium salt is less than or equal to 10%, and optionally less than or equal to 3%.

In the lithium-ion battery according to this application, alternatively, the electrolytic solution further contains an additive, and the additive is at least one selected from fluorosulfonate, difluorooxalate borate, difluorophosphate, difluorobisoxalate, tris(trimethylsilyl)phosphate, or tris(trimethylsilyl)phosphite.

In the lithium-ion battery according to this application, alternatively, based on a total mass of the electrolytic solution, a mass percent of the additive is less than or equal to 3%, and optionally 0.3% to 2.5%.

Another aspect of this application discloses a battery module. The battery module includes the lithium-ion battery according to this application.

Another aspect of this application discloses a battery pack. The battery pack includes at least one of the lithium-ion battery according to this application or the battery module according to this application.

Another aspect of this application discloses an electrical device. The electrical device includes at least one of the lithium-ion battery according to this application, the battery module according to this application, or the battery pack according to this application.

BRIEF DESCRIPTION OF DRAWINGS

FIG. 1(a) is a schematic diagram of a method for measuring La and Lc, and FIG. 1(b) is a schematic diagram of an arc-shaped bend portion (that is, a corner of a jelly-roll structure);

REFERENCE NUMERALS

Figure 1:
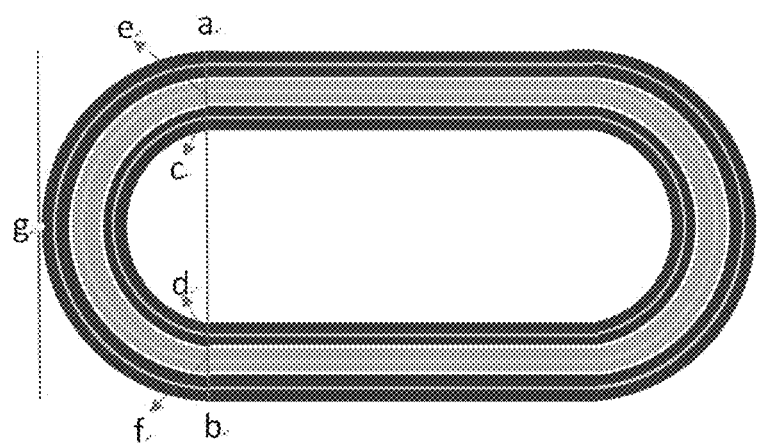
FIG. 1 is a schematic diagram of an electrode assembly of a lithium-ion battery according to an embodiment of this application, where
Figure 1:
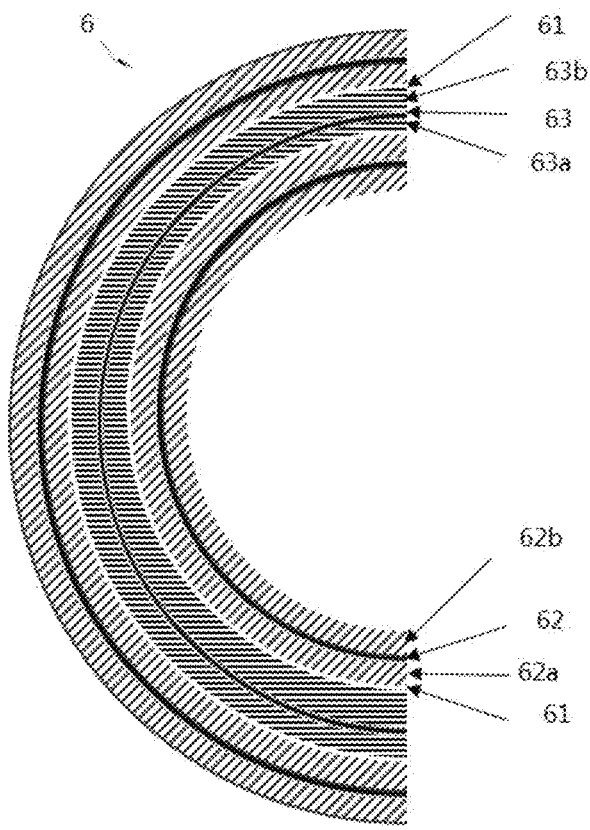

1. battery pack; 2. upper box; 3. lower box; 4. battery module; 5. secondary battery; 51. housing; 52. electrode assembly; 53. cap assembly; 6 arc-shaped bend portion; 61 separator; 62. negative current collector; 62a, 62b. negative material layer; 63. positive current collector; 63a, 63b. positive material layer.

DETAILED DESCRIPTION OF EMBODIMENTS

The following describes in detail a lithium-ion battery, a battery module, a battery pack, and an electrical device according to this application with due reference to drawings. However, unnecessary details may be omitted in some cases. For example, a detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this application, but not intended to limit the subject-matter set forth in the claims.

In an embodiment of this application, this application provides a lithium-ion battery, including: an electrode assembly and an electrolytic solution.

The electrode assembly includes a positive electrode plate and a negative electrode plate that are wound together, and a separator located between the positive electrode plate and the negative electrode plate, the negative electrode plate includes a negative current collector and a negative material layer disposed on at least one surface of the negative current collector, and the positive electrode plate includes a positive current collector and a positive material layer disposed on at least one surface of the positive current collector.

The positive current collector includes a support layer and a metallic conductive layer, and the metallic conductive layer is disposed on at least one of two surfaces of the support layer.

The electrolytic solution contains a first lithium salt $Li_xR_1(SO_2N)_xSO_2R_2$, where $R_1$ and $R_2$ each independently represent an alkyl with 1 to 20 fluorine atoms or carbon atoms, or a fluoroalkyl with 1 to 20 carbon atoms, or a fluoroalkoxyl with 1 to 20 carbon atoms, and x is an integer of 1, 2, or 3.

The lithium-ion battery satisfies the following condition:

$$0.6 \leq \alpha \leq 0.9, \text{ and } 4 \leq w \times \alpha/\beta 1 \leq 25,$$

where, $\alpha$=La/Lc, La is an arc length of a convex surface of the negative current collector corresponding to a concave surface of an innermost first circle of positive electrode in a jelly-roll structure of the electrode assembly, Lc is an arc length of a concave surface of an innermost first circle of positive current collector in the jelly-roll structure of the electrode assembly, and La and Lc are measured in mm; w is a percent of the first lithium salt $Li_xR_1(SO_2N)_xSO_2R_2$ by mass in the electrolytic solution: and $\beta 1$ is a thickness of the metallic conductive layer, measured in μm.

Although the underlying mechanism remains unclear, the applicant hereof has found through a large number of experiments that, when a corner safety coefficient in the electrolytic solution, the content of the first lithium salt, and the thickness of the conductive layer of the positive current collector satisfy a given relationship, corner lithium plating can be suppressed, and the safety problem caused by the corner lithium plating can be solved. In addition, safety hazards of the lithium-ion battery under abuse can be reduced, and the safety performance of the lithium-ion battery can be improved. The "corner safety coefficient" is $\alpha$. In this application, it is defined that $\alpha$=La/Lc. La is an arc length of a convex surface of the negative current collector corresponding to a concave surface of an innermost first circle of positive electrode in a jelly-roll structure of the electrode assembly, and Lc is an arc length of a concave surface of an innermost first circle of positive current collector in the jelly-roll structure of the electrode assembly. La and Lc are measured in mm.

FIG. 1 is a schematic diagram of an electrode assembly of a lithium-ion battery according to an embodiment of this application, where FIG. 1(a) is a schematic diagram of a method for measuring La and Lc, and FIG. 1(b) is a schematic diagram of an arc-shaped bend portion 6 (that is, a corner of a jelly-roll structure); As shown in FIG. 1(a) and FIG. 1(b), the electrode assembly according to this application includes a positive electrode plate and a negative electrode plate that are wound together, and a separator (61) located between the positive electrode plate and the negative electrode plate. The negative electrode plate includes a negative current collector (62) and a negative material layer (62a) disposed on at least one surface (for example, an convex surface) of the negative current collector, or the negative material layers (62a, 62b) may be disposed on both surfaces (that is, an concave surface and the convex surface) of the negative current collector. The positive electrode plate includes a positive current collector (63) and a positive material layer (63a) disposed on at least one surface (for example, an concave surface) of the positive current collector, or the positive material layers (63a, 63b) may be disposed on both surfaces (that is, the concave surface and a convex surface) of the positive current collector.

[Positive Electrode Plate]

The positive electrode plate includes a positive current collector and a positive material layer disposed on at least one surface of the positive current collector.

[Positive Current Collector]

Figure 2:
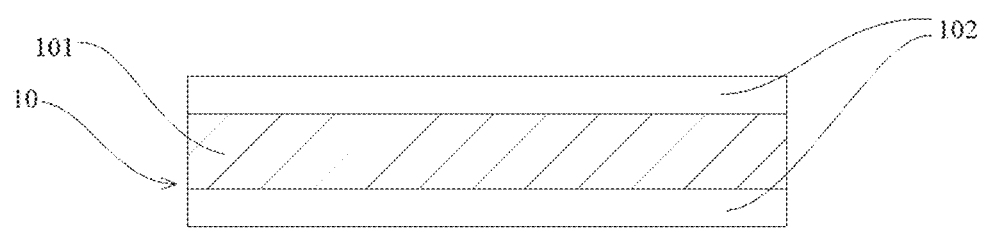
FIG. 2 is a schematic structural diagram of a positive current collector according to an embodiment of this application.
Figure 3:
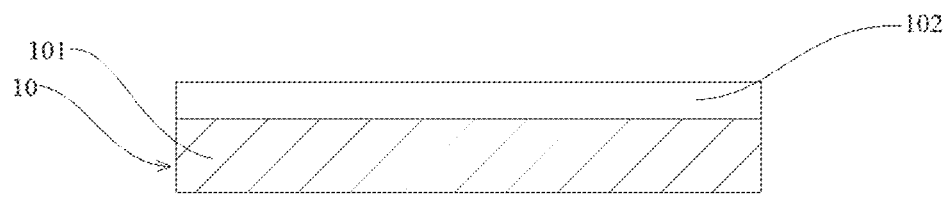
FIG. 3 is a schematic structural diagram of a positive current collector according to another embodiment of this application.

FIG. 2 to FIG. 3 are schematic structural diagrams of a positive current collector according to some embodiments of this application. FIG. 2 is a schematic structural diagram of a positive current collector 10 according to an embodiment of this application. Referring to FIG. 2, the positive current collector 10 includes a support layer 101 disposed in a stacked manner and two metallic conductive layers 102 located on two surfaces of the support layer 101 respectively. The support layer is configured to carry the metallic conductive layer, serves to support and protect the metallic conductive layer. The metallic conductive layer is configured to carry an electrode active material layer and provide electrons for the electrode active material layer, that is, serves to conduct electricity and collect current.

Understandably, the conductive layer 102 may be disposed on just one surface of the support layer 101. For example, FIG. 3 is a schematic structural diagram of a positive current collector 10 according to another embodiment of this application. Referring to FIG. 3, the positive current collector 10 includes a support layer 101 disposed in a stacked manner and one metallic conductive layer 102 located on one surface of the support layer 101.

A person skilled in the art understands that the positive current collector 10 according to this application may further include other optional structural layers. For example, a protection layer (for example, metal oxide) may be additionally disposed on the conductive layer to protect the conductive layer against chemical corrosion, mechanical damage, and the like, and to ensure the operating stability and longevity of the positive current collector 10.

<Support Layer>

In the current collector according to embodiments of this application, the support layer serves a function of supporting and protecting the metallic conductive layer. The support layer is generally made of an organic polymer material or a polymer composite material. Therefore, the density of the support layer is usually lower than that of the conductive layer, thereby increasing a weight energy density of the battery significantly in contrast to a conventional metallic current collector.

In addition, the metallic layer is relatively thin, thereby further increasing the weight energy density of the battery. Further, because the support layer well carry and protect the conductive layer located on a surface of the support layer, thereby reducing the probability of electrode plate fracture that often occurs in a conventional current collector.

In some embodiments of this application, the thickness of the support layer is $\beta 2$. Optionally, $\beta 2$ satisfies: $1\ \mu m \leq \beta 2 \leq 30\ \mu m$, and further optionally $1\ \mu m \leq \beta 2 \leq 20\ \mu m$; and still further optionally $1\ \mu m \leq \beta 2 \leq 15\ \mu m$. In this application, when the thickness of the support layer falls within the foregoing range, the mechanical strength of the support layer is relatively high, the electrode plate is not prone to fracture when being processed or subjected to other processes, and a sufficient volumetric energy density of a battery that uses the current collector is ensured. In addition, in this application, the support layer is made of an organic polymer film of a given thickness, thereby further ensuring a relatively high resistance of the positive current collector, and reducing the temperature of the battery significantly when an internal short circuit occurs in the battery.

In some embodiments of this application, the Young's modulus E of the support layer is optionally greater than or equal to 1.9 GPa. Further, $4\ \text{GPa} \leq E \leq 20\ \text{GPa}$. In some embodiments, the Young's modulus E of the support layer is 1.9 GPa, 2.5 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa. The range of the Young's modulus E of the support layer may be a value range that ends with any two thereof. In this application, the Young's modulus of the support layer falls within the foregoing range, thereby ensuring that the support layer is rigid enough to fulfill the supporting function of the support layer for the metallic conductive layer, and ensuring overall strength of the positive current collector. When the positive current collector is being processed, the support layer does not elongate or deform excessively, thereby preventing the support layer and the metallic conductive layer from breaking. This increases the bonding force between the support layer and the metallic conductive layer, reduces the probability of detaching, ensures relatively high mechanical stability and operating stability of the positive current collector, and in turn, and enables an electrochemical device to achieve relatively high electrochemical performance and a relatively long cycle life.

In some embodiments of this application, a volume resistivity of the support layer is not less than $1.0 \times 10^{-5}\ \Omega \cdot m$. Due to a relatively high volume resistivity of the support layer, a short-circuit resistance of the electrochemical device can be increased when the electrochemical device incurs an internal short circuit in abnormal circumstances such as nail penetration, thereby improving the nail-penetration safety performance of the electrochemical device.

In some embodiments of this application, the material of the support layer may be at least one selected from an insulating polymer material, an insulating polymer composite material, a conductive polymer material, or a conductive polymer composite material.

The insulating polymer material is at least one selected from polyurethane, polyamide, polyterephthalate, polyimide, polyethylene, polypropylene, polystyrene, polyvinyl chloride, poly(acrylonitrile-co-butadiene-co-styrene), polybutanediol terephthalate, poly-p-phenylene terephthamide, polyphenylene ether, polyoxymethylene, epoxy resin, phenol-formaldehyde resin, polytetrafluoroethylene, polyvinylidene difluoride, silicone rubber, polycarbonate, or polyphenylene sulfide.

The insulating polymer composite material is selected from a composite of an insulating polymer material and an inorganic material, where the inorganic material is preferably at least one of a ceramic material, a glass material, or a ceramic composite material.

The foregoing conductive polymer material is selected from a polythiazyl-based polymer material or a doped conjugated polymer material, and optionally is at least one of polypyrrole, polyacetylene, polyaniline, or polythiophene.

The conductive polymer composite material is selected from a composite of an insulating polymer material and a conductive material. The conductive material is at least one selected from a conductive carbon material, a metal material, or a composite conductive material. The conductive carbon material is at least one selected from carbon black, carbon nanotubes, graphite, acetylene black, or graphene. The metal material is at least one selected from nickel, iron, copper, aluminum, or an alloy thereof. The composite conductive material is at least one selected from nickel-coated graphite powder or nickel-coated carbon fiber.

A person skilled in the art may reasonably select and determine the material of the support layer according to the actual needs of the application environment and other factors such as cost. The material of the support layer according to this application is preferably an insulating polymer material or an insulating polymer composite material.

<Metallic Conductive Layer>

In contrast to a conventional metallic current collector, in the current collector according to this embodiment of this application, the metallic conductive layer serves to conduct electricity and collect current, and is configured to provide electrons for the electrode active material layer. The conductive layer is much thinner than that in the conventional metallic current collector, and the density of the support layer is lower than that of metal, thereby reducing the weight of the lithium-ion battery on the basis of ensuring high conductive performance and high current-collecting performance of the conductive layer, and in turn, increasing the energy density of the lithium-ion battery.

In this application, the metallic conductive layer in the positive current collector may be located on just a single surface of the support layer, or may be located on both upper and lower surfaces of the support layer. Preferably, the metallic conductive layer is located on both upper and lower surfaces of the support layer. In this application, when the metallic conductive layer is located on both upper and lower surfaces of the support layer, both surfaces of the positive current collector are highly electronically conductive. Therefore, active material layers may be disposed on both upper and lower surfaces of the positive current collector, thereby effectively increasing the utilization rate of the positive current collector in the battery cell, and in turn, increasing the volumetric energy density and mass energy density of the battery cell.

In this application, the metallic conductive layer of the positive current collector is made of conductive metal. The conductive metal may be one or more of aluminum, aluminum alloy, nickel, or nickel alloy, and preferably aluminum or aluminum alloy. The weight percent of the aluminum element in the aluminum alloy is preferably at least 90%. The aluminum alloy may be, for example, aluminum-zirconium alloy.

In this application, the thickness of the metallic conductive layer is denoted by $\beta 1$ (μm). In this application, the thickness $\beta 1$ of the metallic conductive layer in the positive current collector is expressed in μm, and is 0.52 to 2.4, preferably 0.55 to 2.0, and more preferably 0.8 to 1.3. The thickness of the metallic conductive layer of the positive current collector is controlled to fall within such a range that the resistance of the positive current collector is moderate, thereby achieving both a long cycle life and a high mass energy density. On the other hand, when the thickness of the metallic conductive layer of the positive current collector is excessive, the mass energy density of the battery will be reduced. Conversely, if the thickness of the metal conductive layer of the positive current collector is deficient, although the mass energy density of the battery can be significantly improved, the resistance of the current collector will be excessive. Another consequence is that the conductive layer of the positive current collector is unable to withstand corrosion by the lithium salt configured to suppress corner lithium plating in the electrolytic solution, thereby deteriorating the cycle life of the battery.

In some embodiments of this application, a bonding force between the support layer and the metallic conductive layer in the current collector is expressed as F, where $100\ \text{N/m} \leq F \leq 390\ \text{N/m}$. In this application, when the bonding force between the support layer and the metallic conductive layer in the current collector falls within the foregoing range, the bonding force helps to form a firmer and more stable bond between the support layer and the metallic conductive layer, helps to improve structural stability of the current collector in a corner region of a jelly-roll battery, keeps the metallic conductive layer from peeling off, achieves a stable current-conducting capability, and helps to alleviate the problem of corner lithium plating of the battery.

In this application, the bonding force F between the support layer and the metallic conductive layer in the current collector is determined by the following method: selecting a specimen of a current collector in which the conductive layer is disposed on a single side of the support layer, affixing 3M double-sided tape onto a stainless steel sheet evenly under a room temperature and a normal pressure, and then affixing the specimen onto the double-sided tape evenly, where the width of the specimen is 2 cm. because the bonding force between the support layer and the 3M double-sided tape is greater than the bonding force between the support layer and the metallic conductive layer, using a GoTech tensile testing machine to peel off the conductive layer of the specimen from the insulating layer, reading a maximum tensile force on a tension and shift data chart, and dividing the readout by 0.02 (unit: N) to obtain the bonding force F (N/m) between the support layer and the metallic conductive layer in the current collector.

[Positive Material Layer]

In the lithium-ion battery according to this application, with respect to a positive active material contained in the positive material layer, the positive active material is selected from materials capable of deintercalating and intercalating lithium ions. Specifically, the positive active material may be one or more selected from lithium iron phosphate, lithium manganese iron phosphate, lithium cobalt oxide, lithium nickel oxide, lithium manganese oxide, lithium nickel manganese oxide, lithium nickel cobalt manganese oxide, or lithium nickel cobalt aluminum oxide, or a compound formed by adding other transition metals or non-transition metals into any of the foregoing compounds. However, this application is not limited to such materials, and conventional positive active materials in the field of lithium batteries may be employed instead.

In the lithium-ion battery disclosed in this application, the positive material layer may further include a conductive agent and a binder. The type and content of the conductive agent and the binder are not specifically limited. Conventional types and content of the conductive agent and the binder, which are commonly used in the positive material layer of lithium batteries, may be selected according to actual needs.

[Negative Electrode Plate]

The negative electrode plate includes a negative current collector and a negative material layer disposed on at least one surface of the negative current collector. The negative material layer may be disposed on just one of two surfaces of the negative current collector or on both surfaces of the negative current collector.

The negative current collector is made of copper or copper alloy.

The negative material layer is made of a negative active material. The type of the negative active material is not specifically limited, and is preferably one or more selected from graphite, soft carbon, hard carbon, mesocarbon microbeads, carbon fibers, carbon nanotubes, simple-substance silicon, silicon-oxygen compound, silicon-carbon compound, silicon-carbon composite, or lithium titanium oxide. The negative material layer may further include a conductive agent and a binder. The type and content of the conductive agent and the binder are not specifically limited, and may be selected according to actual needs.

The type of the negative current collector is not specifically limited, and may be selected according to actual needs.

[Separator]

In the lithium-ion battery according to this application, the separator is located between the positive electrode plate and the negative electrode plate to serve an isolation purpose. The type of the separator is not specifically limited, and the separator may be made of any separator material suitable for use in existing batteries, such as but without being limited to, polyethylene, polypropylene, polyvinylidene difluoride, or a multilayer composite film thereof.

[Electrolytic Solution]

In the lithium-ion battery according to this application, the electrolytic solution is configured to infiltrate the electrode assembly to ensure that ions can be conducted between the positive electrode plate and the negative electrode plate.

The electrolytic solution according to this application contains at least a first lithium salt $Li_xR_1(SO_2N)_xSO_2R_2$.

<First Lithium Salt>

In the lithium-ion battery according to this application, the electrolytic solution contains at least a first lithium salt $Li_xR_1(SO_2N)_xSO_2R_2$, where $R_1$ and $R_2$ each independently represent an alkyl with 1 to 20 fluorine atoms or carbon atoms, or a fluoroalkyl with 1 to 20 carbon atoms, or a fluoroalkoxyl with 1 to 20 carbon atoms, and x is an integer of 1, 2, or 3. The first lithium salt may be represented by the following compositional formula:

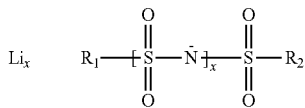

In this application, the first lithium salt $Li_xR_1(SO_2N)_xSO_2R_2$ is added into the electrolytic solution, so as to suppress corner lithium plating of a jelly-roll battery. It is speculated that the reason may lie in the following two aspects. First, due to a special structure of anions of the first lithium salt $Li_xR_1(SO_2N)_xSO_2R_2$, when the first lithium salt is reduced to form a film at the negative electrode, an SEI film so formed possesses a large conjugated polymer structure. Electrons are distributed evenly in the polymer. When solvated lithium ions from the positive electrode contact the SEI on the surface of the negative electrode, an SEI component with a large conjugated polymer is prone to be coordinated to an electron-rich solvent, thereby greatly accelerating desolvation of the solvated lithium ions, and in turn, increasing the kinetic rate for intercalating the lithium ions into the negative electrode. Secondly, sulfonylimide anions of the first lithium salt $Li_xR_1(SO_2N)_xSO_2R_2$ are large conjugated structures. With a low density of electron clouds, the sulfonylimide anions exert a small interaction force on $Li^+$, thereby accelerating dissociation and migration of $Li^+$. In addition, an anion of the sulfonylimide lithium salt is larger than an anion $PF_6^-$ of the commonly used lithium salt $LiPF_6$, and migrates at a low rate, thereby improving the relative mobility of $Li^+$. In this application, with the first lithium salt $Li_xR_1(SO_2N)_xSO_2R_2$ added in the electrolytic solution of the jelly-roll battery, excess lithium ions deintercalated from an arc-shaped corner (that is, a place with a relatively low La/Lc ratio) of the electrode assembly of the positive electrode can be quickly migrated to a place with a relatively high La/Lc ratio, such as a flat region of the electrode assembly, under the action of electric field strength. In addition, due to a high desolvation rate, the lithium ions can quickly enter the negative active material, so that lithium is intercalated evenly in all parts of the negative electrode plate, thereby reducing the risk of corner lithium plating of the jelly-roll battery and improving safety performance of the lithium-ion battery.

The first lithium salt $Li_xR_1(SO_2N)_xSO_2R_2$ added in the electrolytic solution according to this application can further improve high-temperature cycle performance of the lithium-ion battery. A main reason is that the problem of lithium plating at the corner of the electrode assembly is alleviated significantly, and therefore, the loss of active lithium is insignificant during high-temperature cycles.

The first lithium salt $Li_xR_1(SO_2N)_xSO_2R_2$ added in the electrolytic solution according to this application can further improve hot-oven safety performance of the lithium-ion battery. A main reason is that the first lithium salt is highly thermally stable, and can improve the overall thermal stability of the electrolytic solution. In addition, due to dense film formation by the first lithium salt on the surface of the positive and negative electrodes, the positive and negative electrode materials are further obstructed from contacting the electrolytic solution, thereby further increasing the hot oven temperature at the time of failure of the battery cell and improving the safety performance of the battery cell.

In addition, in this application, the mass fraction of the first lithium salt in the electrolytic solution is 5% to 30%, preferably 6% to 25%, and further preferably 11% to 20%. In other words, when w represents the percent of the first lithium salt in the electrolytic solution by mass, $5 \leq w \leq 30$, preferably $6 \leq w \leq 25$, and further preferably $11 \leq w \leq 20$. In this application, when the mass percent of the first lithium salt in the electrolytic solution falls within the foregoing range, it is ensured that the first lithium salt can effectively participate in the formation of the SEI film, thereby reducing the amount of the solvent that exists in the electrolytic solution and that participates in the film formation, and helping to improve the cycle performance of the lithium-ion battery. In addition, the content of the first lithium salt is moderate, thereby ensuring good solvation status of the first lithium salt in the electrolytic solution, helping to control an electrochemical window corresponding to the first lithium salt, participating in the film formation preemptively, and also helping to improve the cycle performance of the battery.

<Second Lithium Salt>

In this application, the electrolytic solution may further contain a second lithium salt. The second lithium salt according to this application serves to alleviate the corrosion caused by the first lithium salt to the metallic conductive layer in the positive current collector, and is especially suitable for use in a positive current collector with a metallic conductive layer containing the aluminum element. The second lithium salt is at least one selected from $LiPF_6$, $LiAsF_6$, or $LiBF_4$. In order for the second lithium salt in the electrolytic solution to reliably suppress the corrosion caused by the first lithium salt to the aluminum foil, the mass percent of the second lithium salt in the electrolytic solution is less than or equal to 10%, preferably less than or equal to 6%, and more preferably less than or equal to 3%.

In the lithium-ion battery according to this application, when the electrolytic solution contains the first lithium salt, the aluminum foil of the conventional positive current collector is usually corroded by the first lithium salt. In this application, by adding the second lithium salt in the electrolytic solution, the corrosion of the aluminum foil can be suppressed, so that the corrosion of the positive current collector can be further suppressed, and the cycle performance of the lithium-ion battery can be improved.

<Additive>

The electrolytic solution may further contain an additive. For example, the additive is at least one selected from fluorosulfonate, difluorooxalate borate, difluorophosphate, difluorobisoxalate, tris(trimethylsilyl)phosphate, or tris(trimethylsilyl)phosphite (however, such additives exclude the first lithium salt and second lithium salt described above). The type of the salt may be an alkali metal salt. To be specific, metal ions of the salt may be, for example, $Li^+$, $Na^+$, $K^+$, $Cs^+$. More preferably, the additive is at least one selected from lithium fluorosulfonate, lithium difluoro(oxalato)borate, tris(trimethylsilyl)phosphate, or lithium difluorophosphate.

Such additives can serve to reduce the impedance of the lithium-ion battery. During the chemical formation of the lithium-ion battery, the foregoing additives can participate in the film formation of the negative electrode, thereby further reducing the impedance of the negative SEI film, and in turn, increasing the transmission rate of lithium ions in the SEI film, and further reducing the impedance of the lithium-ion battery. In this way, the lithium ions deintercalated from the positive electrode can enter the negative electrode more quickly to prevent lithium plating in the negative electrode. In addition, the additive can participate in the film formation of the negative electrode, thereby further improving the stability of the negative electrode interface, and in turn, further improving the high-temperature cycle performance.

In the electrolytic solution of the lithium-ion battery according to this application, based on a total mass of the electrolytic solution, a mass percent of the additive is preferably less than or equal to 3%, optionally less than or equal to 2.5%, optionally 0.3% to 2.5%, and further optionally 0.5% to 2%. Alternatively, the electrolytic solution according to this application may contain no such additives described above.

In the electrolytic solution of the lithium-ion battery according to this application, optionally, other additives may include one or more of lithium perchlorate ($LiClO_4$), lithium trifluoromethanesulfonate (LiTFS), lithium difluoro(bisoxalato) phosphate (LiDFOP), or lithium tetrafluoro(oxalato) phosphate (LiTFOP). The content of such additives may be appropriately adjusted according to specific needs. Alternatively, the electrolytic solution according to this application may contain no such other additives.

<Organic Solvent>

In the lithium-ion battery according to this application, the electrolytic solution contains an organic solvent. The type of the organic solvent is not specifically limited, and may be selected according to practical needs. Specifically, the organic solvent may include one or more selected from various chain carbonates, cyclic carbonates, or carboxylates. The types of the chain carbonate, cyclic carbonate, and carboxylate are not specifically limited, and may be selected according to practical needs. Optionally, the organic solvent may further include one or more of diethyl carbonate, dipropyl carbonate, ethyl methyl carbonate, methyl propyl carbonate, ethyl propyl carbonate, ethylene carbonate, propylene carbonate, butylene carbonate, γ-butyrolactone, methyl formate, ethyl acetate, propyl acetate, methyl propionate, ethyl propionate, methyl propionate, or tetrahydrofuran.

The content of the organic solvent in the electrolytic solution may be appropriately adjusted according to factors such as the mass percent of the fluorosulfonates and/or difluorophosphates.

The electrolytic solution according to this application is prepared by adding the first lithium salt into the organic solvent, adding the second lithium salt and the foregoing additives as required, adding other additives as required, and performing steps such as stirring, mixing, and filtering.

The viscosity of the electrolytic solution is optionally less than or equal to 4 mPa·s, and further optionally less than or equal to 3.5 mPa·s. The viscosity of the electrolytic solution is set to fall within such numerical ranges, so as to further reduce concentration polarization during transfer of lithium ions, increase the transfer speed of the lithium ions in the liquid, alleviate corner lithium plating, and improve the safety performance of the lithium-ion battery.

[Lithium-Ion Battery]

The lithium-ion battery according to this application may be prepared by a conventional method. For example, the preparation method is: placing an electrode assembly in a housing, drying, injecting an electrolytic solution, and then performing steps such as chemical formation and standing to make a lithium-ion battery.

As mentioned above, the most important inventive step of the lithium-ion battery according to this application is that the following conditions are satisfied: $0.6 \le \alpha \le 0.9$, and $4 \le w \times \alpha/\beta1 \le 25$. In this application, preferably, the following conditions are satisfied: $0.6 \le \alpha \le 0.9$, and $8.7 < w \times \alpha/\beta1 \le 17$.

By satisfying the foregoing conditions, this application enables the corner safety factor α, the content w of the first lithium salt, and the thickness β1 of the metallic conductive layer of the positive current collector to function well in a synergistic manner. Therefore, this application can suppress corner lithium plating, solve the safety problem caused by the corner lithium plating, and additionally, reduce the safety hazards of the lithium-ion battery under abuse, and improve the safety performance of the lithium-ion battery.

Figure 4:
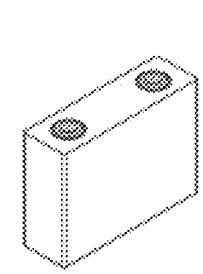
FIG. 4 is a schematic diagram of a lithium-ion battery according to an embodiment of this application.

The shape of the lithium-ion battery is not specifically limited in this application, and may be cylindrical, prismatic or any other shape. FIG. 4 shows a prismatic lithium-ion battery 5 as an example.

Figure 5:
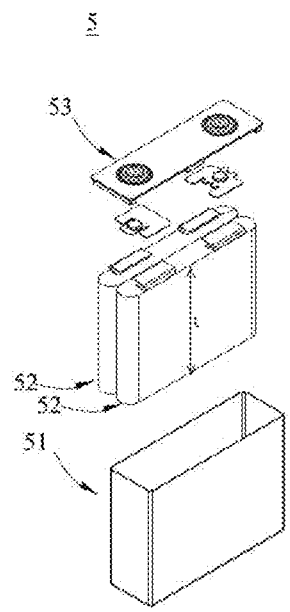
FIG. 5 is an exploded view of the lithium-ion battery shown in FIG. 4 according to an embodiment of this application.

In some embodiments, referring to FIG. 5, the outer package may include a housing 51 and a cover plate 53. The housing 51 may include a bottom plate and a side plate connected to the bottom plate. The bottom plate and the side plate close in to form an accommodation cavity. The housing 51 is provided with an opening that communicates with the accommodation cavity. The cover plate 53 can cover the opening to close the accommodation cavity. The positive electrode plate, the negative electrode plate, and the separator may be wound or stacked to form the electrode assembly 52. The electrode assembly 52 is packaged in the accommodation cavity. The electrolytic solution serves a function of infiltration in the electrode assembly 52. The number of electrode assemblies 52 in a lithium-ion battery 5 may be one or more, and may be selected by a person skilled in the art as actually required.

In addition, a lithium-ion battery, a battery module, a battery pack, and a device according to this application are described below with due reference to drawings.

[Battery Module]

In some embodiments, the lithium-ion battery according to a first aspect of this application may be assembled into a battery module. The battery module may include one or more lithium-ion batteries, and the specific number of lithium-ion batteries in a battery module may be selected by a person skilled in the art depending on practical applications and capacity of the battery module.

Figure 6:
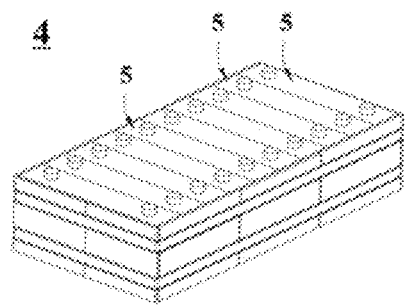
FIG. 6 is a schematic diagram of a battery module according to an embodiment of this application.

FIG. 6 shows a battery module 4 as an example. Referring to FIG. 6, in the battery module 4, a plurality of lithium-ion batteries 5 may be arranged sequentially along a length direction of the battery module 4. Alternatively, the secondary batteries may be arranged in any other manner. Further, the plurality of lithium-ion batteries 5 may be fixed by a fastener.

Optionally, the battery module 4 may further include a shell that provides an accommodation space. The plurality of lithium-ion batteries 5 are accommodated in the accommodation space.

[Battery Pack]

In some embodiments, the battery modules according to this application may be assembled into a battery pack. The number of battery modules contained in a battery pack may be selected by a person skilled in the art depending on practical applications and capacity of the battery pack.

Figure 7:
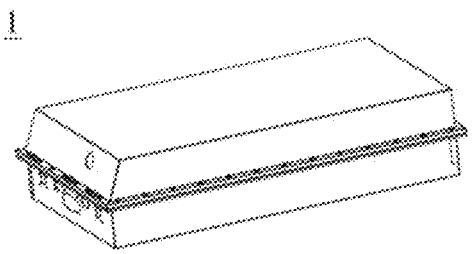
FIG. 7 is a schematic diagram of a battery pack according to an embodiment of this application.
Figure 8:
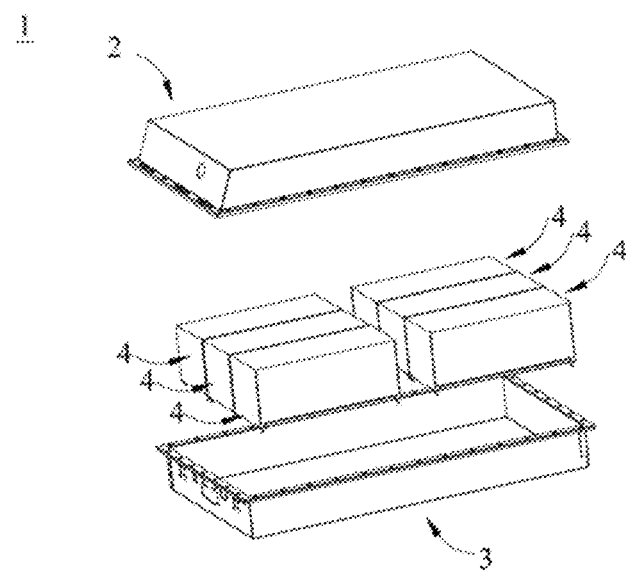
FIG. 8 is an exploded view of the battery pack shown in FIG. 7 according to an embodiment of this application.

FIG. 7 and FIG. 8 show a battery pack 1 as an example. Referring to FIG. 7 and FIG. 8, the battery pack 1 may contain a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

[Electrical Device]

Further, this application provides an electrical device. The electrical device includes at least one of the lithium-ion battery, the battery module, or the battery pack according to this application. The lithium-ion battery, the battery module, or the battery pack may be used as a power supply of the device, or used as an energy storage unit of the device. The device may be, but is not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The lithium-ion battery, the battery module, or the battery pack may be selected for the electrical device according to practical requirements.

Figure 9:
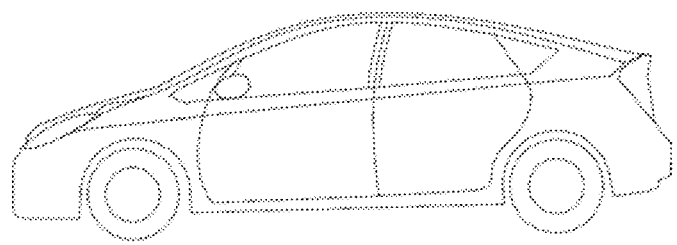
FIG. 9 is a schematic diagram of a device that uses a lithium-ion battery as a power supply according to an embodiment of this application.

FIG. 9 shows a device as an example. The device may be a battery electric vehicle, a hybrid electric vehicle, a plug-in hybrid electric vehicle, or the like. To meet the requirements of the device for a high power and a high energy density of the lithium-ion battery, a battery pack or a battery module may be used for the device.

In another example, the device may be a mobile phone, a tablet computer, a notebook computer, or the like. The device is generally required to be thin and light, and may use a lithium-ion battery as a power supply.

Embodiments

This application is further described below with reference to embodiments. Understandably, the embodiments are merely intended to illustrate this application but not to limit the scope of this application.

Lithium-ion batteries in Embodiments 1 to 26 and Comparative Embodiments 1 to 4 are prepared by the following method.

(1) Preparing a Positive Current Collector

The current collector 1 is a conventional aluminum current collector, that is, aluminum metal foil.

The current collectors 2 to 12 are prepared by the following method: Placing a surface-cleaned support layer (PET, with an elastic modulus of 4600 MPa) into a vacuum chamber. Melting and evaporating a high-purity aluminum filament in an aluminum metal evaporation chamber at a temperature of 1500° C. Cooling the evaporated aluminum metal in a cooling system inside the vacuum chamber, and finally, depositing the aluminum on both surfaces of the support layer to form conductive layers of different thicknesses by controlling the deposition time in a way shown in Table A below.

TABLE A

| Positive current collector | Thickness of single-side metallic conductive layer (μm) | Thickness of support layer (μm) | Deposition time (min) | Bonding force F (N/m) |
|---|---|---|---|---|
| Current collector 2 | 0.52 | 11.96 | 18 | 280 |
| Current collector 3 | 0.55 | 11.9 | 20 | 271 |
| Current collector 4 | 0.6 | 11.8 | 23 | 264 |
| Current collector 5 | 0.64 | 11.72 | 25 | 276 |
| Current collector 6 | 0.8 | 11.4 | 28 | 253 |
| Current collector 7 | 1 | 11 | 30 | 275 |
| Current collector 8 | 1.1 | 10.8 | 32 | 246 |
| Current collector 9 | 1.2 | 10.6 | 34 | 253 |
| Current collector 10 | 1.3 | 10.4 | 36 | 260 |
| Current collector 11 | 2 | 9 | 40 | 289 |
| Current collector 12 | 2.4 | 8.2 | 42 | 252 |

(2) Preparing a Positive Electrode Plate

Dissolving $LiNi_{0.8}Mn_{0.1}Co_{0.1}O_2$ as a positive active material, carbon black (Super P) as a conductive agent, and polyvinylidene difluoride (PVDF) as a binder in an N-methyl-pyrrolidone (NMP) solvent at a weight ratio of 96.8:2:1.2, and stirring and mixing well to obtain a positive slurry; and coating a positive current collector with the positive slurry evenly, and performing drying, cold pressing, and slitting to obtain a positive electrode plate.

(3) Preparing a Negative Electrode Plate

Dissolving an artificial graphite as an active substance, acetylene black as a conductive carbon, styrene butadiene rubber (SBR) as a binder, sodium carboxymethyl cellulose (CMC) as a thickener at a weight ratio of 95.5:1.6:1.5:1.4 in a deionized water solvent, mixing such materials with the deionized water solvent evenly to make a negative slurry. Coating a negative current collector copper foil with the negative slurry evenly, drying the copper foil to obtain a negative electrode film, and then performing cold pressing and slitting to obtain a negative electrode plate.

(4) Preparing a Jelly-Roll Assembly

The electrode assemblies in Comparative Embodiments 1 to 4, Embodiments 1 to 7, and Embodiments 10 to 26 are designed as follows: The thickness of a negative current collector copper foil is 6 µm; the negative current collector is coated with a negative electrode material on both sides, and then cold-pressed; the thickness of the negative electrode plate is 140 µm; the thickness of a positive current collector is 13 µm; the positive current collector is coated with a positive electrode material on both sides, and then cold-pressed; the thickness of the positive electrode plate is 114 µm; and the thickness of the separator is 7 µm. First, the separator is wound for half a cycle, then the negative electrode plate is inserted and wound for one cycle, and then the positive electrode plate is inserted and wound together. A 0.4 MPa pressure roller is applied during the winding to obtain a corresponding electrode assembly.

The electrode assembly in Embodiment 8 is designed as follows: The thickness of a negative copper foil substrate is 6 µm; the copper foil is coated with a negative electrode material on both sides, and then cold-pressed; the thickness of the negative electrode plate is 140 µm; the thickness of a positive aluminum foil substrate is 13 µm; the aluminum foil is coated with a positive electrode material on both sides, and then cold-pressed; the thickness of the positive electrode plate is 114 µm; and the thickness of the separator is 9 µm. First, the separator is wound for one cycle, then the negative electrode plate is inserted and wound for one cycle, and then the positive electrode plate is inserted and wound together. A 0.8 MPa pressure roller is applied during the winding to finally obtain a corresponding electrode assembly.

The electrode assembly in Embodiment 9 is designed as follows: The thickness of a negative copper foil substrate is 6 µm; the copper foil is coated with a negative electrode material on both sides, and then cold-pressed; the thickness of the negative electrode plate is 140 µm; the thickness of a positive aluminum foil substrate is 13 µm; the aluminum foil is coated with a positive electrode material on both sides, and then cold-pressed; the thickness of the positive electrode plate is 114 µm; and the thickness of the separator is 9 µm. First, the separator is wound for 10 cycles, then the negative electrode plate is inserted and wound for one cycle, and then the positive electrode plate is inserted and wound together. A 0.4 MPa pressure roller is used during the winding to finally obtain a corresponding electrode assembly.

(5) Preparing an Electrolytic Solution

Mixing organic solvents EC and EMC well in an argon atmosphere glovebox ($H_2O<0.1$ ppm, $O_2<0.1$ ppm) at a volume ratio of 3:7, adding 2% ethylene sulphite, adding the corresponding lithium salt and other additives in Table 1 to Table 4, and stirring evenly to obtain a corresponding electrolytic solution. It needs to be noted that: in Comparative Embodiments 1 to 4 and Embodiments 1 to 18, the first lithium salt is added in a way shown in Table 1 to Table 3, but without adding the second lithium salt and additives; in Embodiments 19 to 26, the first lithium salt is added in the same way as in Embodiment 1, and the second lithium salt and/or additives are added in a way shown in Table 4.

(6) Preparing a separator: A conventional polypropylene film is used as a separator. The thickness of the separator in Comparative Embodiments 1 to 4, Embodiments 1 to 7, and Embodiments 10 to 28 is 7 µm, and the thickness of the separator in Embodiments 8 and 9 is 9 µm.

(7) Preparing a Lithium-Ion Battery

The preparation method is: placing an electrode assembly in a housing, drying, injecting an electrolytic solution, and then performing steps such as chemical formation and standing to make a lithium-ion battery.

The following describes the test processes of relevant parameters of the electrode assembly.

<Testing the Arc Length (La) of the Convex Surface of the Innermost Cycle of Negative Substrate and the Arc Length (Lc) of the Concave Surface of the Innermost Cycle of Positive Substrate>

Performing X-ray computed tomography for lithium-ion batteries with reference to ISO 15708:22 Non-Destructive Testing Radiation Methods Computed Tomography by using an instrument of Nanomelx Neo 180 manufactured by Waygate Technologies: First, fixing the electrode assembly onto a high-precision computerized programmable specimen scanning turntable, and then turning on the instrument to acquire two-dimensional projections by using Phoenix Datos X Acquisition software. Performing geometric correction upon completion of acquiring the two-dimensional projections, and then performing three-dimensional volume reconstruction to non-destructively obtain a three-dimensional structure of the electrode assembly. Measuring the arc length of the convex surface of the innermost cycle of negative electrode and the arc length of the concave surface of the innermost cycle of positive electrode by using CAD software. The specific operations are as follows:

As shown in FIG. 1(a), making a tangent line at an intersection g of a corner arc of the outermost circle of the electrode assembly, translating the tangent line toward the interior of the electrode assembly until intersecting the outermost circle of the electrode assembly at points a and b. When the distance between a and b increases by an increment less than or equal to ±0.01 mm, the tangent line intersects the innermost circle of positive electrode of the electrode assembly at points c and d, and intersects the innermost circle of negative electrode at points e and f. Measuring the arc between c and d and the arc between e and f to obtain a c-d arc length Lc (mm) and an e-f arc length La (mm) respectively.

Comparative Embodiments 1 to 2, Embodiments 1 to 7, and Embodiments 10 to 28: La=2.574 mm, and Lc=3.218 mm Embodiment 8: La=2.421 mm, and Lc=3.999 mm.

Embodiment 9: La=4.528 mm, and Lc=5.046 mm.

The following describes a test process of performance indicators of the lithium-ion battery.

<Status of the Corner of the Convex Surface of the Negative Electrode When Fully Charged>

Charging a chemically formed battery at a constant current of 1.5 C at 25° C. until the voltage reaches 4.25 V, then charging the battery at a constant voltage of 4.25 V until the current is less than 0.05 C, and then discharging the battery at a current of 1 C until the voltage reaches 2.8 V. Repeating the foregoing process for 50 cycles, and then charging the battery at a constant current of 1.5 C until the voltage reaches 4.25 V, and charging the battery at a constant voltage of 4.25 V until the current is less than 0.05 C, thereby obtaining a fully charged lithium-ion battery. Finally, disassembling the lithium-ion battery, observing the status of corner lithium plating on the convex surface of the negative electrode, and recording the status in the column of "corner lithium plating on convex surface".

The evaluation criteria based on the observation are as follows.

No lithium plating: At the corner region, the surface of the negative electrode when fully charged is golden yellow. When the surface is wiped with dust-free paper, no gray metal lithium powder is left on the paper.

Slight lithium plating: At the corner region, the surface of the negative electrode when fully charged is dark yellow. When the surface is wiped with dust-free paper, gray metal lithium powder is left on the paper.

Average lithium plating: At the corner region, the surface of the negative electrode when fully charged is locally gray, without golden yellow.

Massive lithium plating: At the corner region, the surface of the negative electrode when fully charged is fully gray, without golden yellow.

<Mass Energy Density>

Charging the lithium-ion battery at a constant current of 0.5 C at 25° C. until the voltage reaches 4.25 V, and then charging the battery at a constant voltage of 4.25 V until the current is less than 0.05 C; and then discharging the battery at a current of 0.33 C until the voltage reaches 2.8 V, and recording the discharge energy Q. Weighing the lithium-ion battery to obtain a weight m, and calculating according to: mass energy density (unit: Wh/kg)=Q/m. Recording the calculation result in the column "Mass energy density".

<Internal Resistance of the Battery>

Adjusting the SOC of the lithium-ion battery to 50% SOC, and then measuring the internal resistance of the battery with an AC internal resistance tester, where the infinitesimal disturbance is 5 mV and the frequency is 1000 Hz. Recording the measurement results in Table 1.

<Testing 45° C. Cycle Performance>

Charging the lithium-ion battery at a constant current of 1 C at 45° C. until the voltage reaches 4.25 V, and then charging the battery at a constant voltage of 4.25 V until the current is less than 0.05 C, and then discharging the battery at a constant current of 1 C until the voltage reaches 2.8 V, thereby completing a charge-and-discharge cycle. Repeating the charge-and-discharge process, and calculating the number of cycles when the capacity retention rate of the lithium-ion battery reaches 80%. Recording the measurement results in Table 2 to Table 4.

<Nail Penetration Test>

Charging the lithium-ion battery at a constant current of 0.5 C at 25° C. until the voltage reaches 4.25 V, and then charging the battery at a constant voltage of 4.25 V until the current is less than 0.05 C, and then discharging the battery at a constant current of 1 C until the voltage reaches 2.8 V, thereby completing a charge-and-discharge cycle. Repeating the charge-and-discharge process for 100 cycles, and then fixing the lithium-ion battery that is fully charged. Penetrating the lithium-ion battery with a steel nail 8 mm in diameter at a speed of 25 mm/s at a room temperature. Leave the steel nail to stay in the battery. Observing and testing the battery that is penetrated by the nail.

Testing the battery temperature: Using a multi-wire thermometer, attaching a temperature sensing wire to a geometric center of the penetration surface and a geometric center of the back surface of the battery to be penetrated. After penetration, keeping measuring the battery temperature for five minutes, and recording the battery temperatures within the five minutes. Recording the results in the column "Battery temperature rise" in Table 1.

Testing the battery voltage: Connecting the positive electrode and negative electrode of the battery to be penetrated to a measurement terminal of an internal resistance meter. After penetration, keeping measuring the battery voltage for five minutes, and recording the battery voltage within the five minutes. Recording the results in the column "Battery voltage" in Table 1.

<Hot Oven Test>

Charging a lithium-ion battery at a constant current of 0.5 C under a normal temperature until the voltage reaches 4.25 V, then charging the battery at a constant voltage of 4.25 V until the current is lower than 0.05 C, and then placing the lithium-ion battery into a thermostat, heating the thermostat to 150° C. at a speed of 5° C./min, and drying the lithium-ion battery in the 150° C. thermostat for 30 minutes. Recording the time required for the lithium-ion battery to smoke and catch fire. If the lithium-ion battery does not smoke or catch fire, continuing to heat up the thermostat by 5° C., and keeping the temperature for 30 minutes. The foregoing process goes on until the lithium-ion battery fails. Recording the thermostat temperature at the time of failure of the lithium-ion battery and the duration of keeping the temperature in the column of "Hot oven temperature at failure and temperature keeping duration" in Table 3.

TABLE 1

| Serial Number | Positive current collector | Thickness $\beta_1$ of metallic layer (μm) | Type of first lithium $\alpha$ salt | Content of LiPF$_6$ (%) | w(%) | w × $\alpha/\beta_1$ | Internal resistance of battery (mΩ) | Status of corner lithium plating of convex surface | Battery temperature rise (° C.) | Battery voltage (V) |
|---|---|---|---|---|---|---|---|---|---|---|
| Comparative Embodiment 1 | Current collector 1 | / | 0.8 / | 16 | 0 | 0.0 | 0.726 | Massive lithium plating | NA | NA |
| Comparative Embodiment 2 | Current collector 7 | 1 | 0.8 / | 16 | 0 | 0.0 | 0.727 | Massive lithium plating | 73 | 0 |
| Embodiment 1 | Current collector 7 | 1 | 0.8 LiFSI | 0 | 16 | 12.8 | 0.446 | No lithium plating | 3 | 4.19 |
| Embodiment 2 | Current collector 9 | 1.2 | 0.8 LiFSI | 10 | 6 | 4.0 | 0.643 | No lithium plating | 16.9 | 3.79 |
| Embodiment 3 | Current collector 9 | 1.2 | 0.8 LiFSI | 0 | 13 | 8.7 | 0.531 | No lithium plating | 6.3 | 4.08 |
| Embodiment 4 | Current collector 6 | 0.8 | 0.8 LiFSI | 0 | 17 | 17.0 | 0.502 | No lithium plating | 5.1 | 4.1 |
| Embodiment 5 | Current collector 5 | 0.64 | 0.8 LiFSI | 0 | 20 | 25.0 | 0.604 | No lithium plating | 9.2 | 3.99 |
| Comparative Embodiment 3 | Current collector 7 | 1 | 0.8 LiFSI | 13 | 3 | 2.4 | 0.694 | Massive lithium plating | 59 | 0 |
| Comparative Embodiment 4 | Current collector 4 | 0.6 | 0.8 LiFSI | 0 | 25 | 33.3 | 0.702 | Average lithium plating | 54 | 0 |
| Embodiment 6 | Current collector 8 | 1.1 | 0.6 LiFSI | 0 | 18 | 9.8 | 0.536 | No lithium plating | 5.4 | 4.09 |
| Embodiment 7 | Current collector 7 | 1 | 0.9 LiFSI | 0 | 14 | 12.6 | 0.402 | No lithium plating | 2.9 | 4.21 |

TABLE 2

| Serial Number | Positive current collector | Thickness β1 of metallic layer (μm) | α | Type of first lithium salt | w (%) | w × α/β1 | Status of corner lithium plating of convex surface | Mass energy density (Wh/kg) | Number of 45° C. cycles |
|---|---|---|---|---|---|---|---|---|---|
| Embodiment 8 | Current collector 2 | 0.52 | 0.8 | LiFSI | 16 | 24.6 | No lithium plating | 270.8 | 658 |
| Embodiment 9 | Current collector 3 | 0.55 | 0.8 | LiFSI | 16 | 23.3 | No lithium plating | 270.1 | 890 |
| Embodiment 10 | Current collector 6 | 0.8 | 0.8 | LiFSI | 16 | 16.0 | No lithium plating | 268.2 | 1021 |
| Embodiment 1 | Current collector 7 | 1 | 0.8 | LiFSI | 16 | 12.8 | No lithium plating | 266.4 | 1102 |
| Embodiment 11 | Current collector 10 | 1.3 | 0.8 | LiFSI | 16 | 9.8 | No lithium plating | 259.3 | 1143 |
| Embodiment 12 | Current collector 11 | 2 | 0.8 | LiFSI | 16 | 6.4 | No lithium plating | 251.1 | 1175 |
| Embodiment 13 | Current collector 12 | 2.4 | 0.8 | LiFSI | 16 | 5.3 | No lithium plating | 247.2 | 1182 |

TABLE 3

| Serial Number | Positive current collector | Thickness β1 of metallic layer (μm) | α | Type of first lithium salt | w (%) | w × α/β1 | Status of corner lithium plating of convex surface | Hot oven temperature at failure and temperature keeping duration | Number of 45° C. cycles |
|---|---|---|---|---|---|---|---|---|---|
| Embodiment 14 | Current collector 7 | 1 | 0.8 | LiFSI | 5 | 4.0 | No lithium plating | 150° C., 16 min | 953 |
| Embodiment 15 | Current collector 7 | 1 | 0.8 | LiFSI | 11 | 8.8 | No lithium plating | 165° C., 26 min | 1046 |
| Embodiment 16 | Current collector 7 | 1 | 0.8 | LiFSI | 20 | 16.0 | No lithium plating | 175° C., 6 min | 1123 |
| Embodiment 17 | Current collector 7 | 1 | 0.8 | LiFSI | 25 | 20.0 | No lithium plating | 175° C., 24 min | 1067 |
| Embodiment 18 | Current collector 7 | 1 | 0.8 | LiFSI | 30 | 24.0 | Slight lithium plating | 175° C., 25 min | 903 |

TABLE 4

| Serial Number | Type of second lithium salt | Content of second lithium salt (%) | Type of additive | Content of additive (%) | Status of corner lithium platina of convex surface | Number of 45° C. cycles |
|---|---|---|---|---|---|---|
| Embodiment 1 | / | / | / | / | No lithium plating | 1102 |
| Embodiment 19 | $LiPF_6$ | 0.1 | / | / | No lithium plating | 1205 |
| Embodiment 20 | $LiPF_6$ | 3 | / | / | No lithium plating | 1287 |
| Embodiment 21 | $LiPF_6$ | 10 | / | / | No lithium plating | 1121 |
| Embodiment 22 | $LiBF_4$ | 3 | / | / | No lithium plating | 1298 |
| Embodiment 23 | $LiAsF_6$ | 3 | / | / | No lithium plating | 1289 |
| Embodiment 24 | $LiPF_6$ | 3 | $LiSO_3F$ | 1 | No lithium plating | 1409 |
| Embodiment 25 | $LiPF_6$ | 3 | $LiPO_2F_2$ | 1 | No lithium plating | 1453 |
| Embodiment 26 | $LiPF_6$ | 3 | $LiSO_3F$ + $LiPO_2F_2$ | $LiSO_3F$ (0.5%) + $LiPO_2F_2$ (1%) | No lithium plating | 1532 |

As can be seen from Table 1, Table 2, and Table 3: in Embodiments 1 to 18, by satisfying the conditions: $0.6 \le \alpha \le 0.9$, and $4 \le w \times \alpha/\beta1 \approx 25$, the lithium-ion battery is ensured to achieve a high energy density, the corner lithium plating is suppressed significantly, and the safety performance of the battery is improved greatly. Preferably, $w \times \alpha/\beta1$ is 3 to 23, and more preferably 5 to 17. By setting $w \times \alpha/\beta1$ to fall within such preferable ranges, better technical effects can be achieved.

In addition, as can be seen from Table 1, Table 2, and Table 3, in Embodiments 1 to 18, by using the electrolytic solution containing the first lithium salt, the corner lithium plating of the convex surface of the negative electrode can be improved effectively. Further, as can be seen from the data of Embodiments 1 to 18, the relationship between w and a exerts a great impact on the volumetric energy density of lithium-ion battery, the corner lithium plating of the convex surface of the negative electrode, and the internal resistance of the lithium-ion battery. In addition, as can be seen from Table 1, Table 2, and Table 3, when the dosage of the first lithium salt is moderate, the internal resistance of the lithium-ion battery under a normal temperature is ensured to be appropriate. In addition, as can be seen from Table 1, Table 2, and Table 3, the electrolytic solution containing the first lithium salt further improves the high-temperature cycle performance of the lithium-ion battery.

In the battery in Comparative Embodiment 1 in Table 1, the current collector and the first lithium salt according to embodiments of this application are lacking, that is, conventional positive electrode plate and lithium salt $LiPF_6$ are used in the battery. As a result, at the instant of penetrating the battery with a nail, the temperature of the battery soars up by several hundred degrees, and the voltage plummets to zero. This shows that, at the instant of penetration, the battery incurs an internal short circuit, and generates a lot of heat. The battery is thermally runaway and destroyed in an instant, and fails to work.

In the battery in Comparative Embodiment 2 in Table 1, although the current collector according to embodiments of this application is used, because the electrolytic solution does not contain the first lithium salt, the internal resistance of the lithium-ion battery increases, the corner lithium plating occurs massively on the convex surface, and the battery temperature still rises considerably.

In Comparative Embodiment 3 in Table 1. due to a low content of the first lithium salt in the electrolytic solution, $w \times \alpha/\beta1$ is lower than the range specified in this application. Consequently, lithium plating occurs massively on the convex surface at the corner. The precipitated active lithium leads to severe heat emission when an internal short circuit of the lithium-ion battery is caused by the nail penetration, the temperature of the lithium-ion battery rises sharply, and the internal voltage of the lithium-ion battery drops to 0 after occurrence of the short circuit.

In Comparative Embodiment 4 in Table 1, due to an excessive content of the first lithium salt in the electrolytic solution, $w \times \alpha/\beta1$ exceeds the range specified in this application. Consequently, the electrolytic solution is insufficient in kinetics, and the corresponding film formation resistance is relatively high. As a result, lithium plating occurs to an average degree on the convex surface at the corner. The precipitated active lithium leads to severe heat emission when an internal short circuit of the lithium-ion battery is caused by the nail penetration, the temperature of the lithium-ion battery rises sharply, and the internal voltage of the lithium-ion battery drops to 0 after occurrence of the short circuit.

As can be seen from Table 2, in this application, the thickness $\beta1$ (measured in μm) of the metallic conductive layer of the positive current collector is 0.52 to 2.4, preferably 0.55 to 2, and more preferably 0.8 to 1.3. The thickness of the metallic conductive layer is controlled to fall within such a range that the resistance of the positive current collector is moderate, thereby achieving both a long cycle life and a high mass energy density.

In Embodiment 13 in Table 2, although the corner lithium plating on the convex surface can be suppressed, because the current collector is relatively thick, the percentage of inactive materials in the lithium-ion battery is higher, and therefore, the mass energy density of the lithium-ion battery is lower.

In addition, as can be seen from Table 3, in this application, the mass fraction of the first lithium salt in the electrolytic solution is preferably 5% to 30%, more preferably 6% to 25%, and further preferably 11% to 20%. By setting the content of the first lithium salt in the electrolytic solution to such values, the hot-oven safety performance of the lithium-ion battery can be further improved. In addition, the higher content of the lithium salt makes the electrolytic solution more thermally stable.

As can be seen from Embodiment 18 in Table 3, if the content of the first lithium salt is relatively high, on the one hand, the electrolytic solution is relatively inferior in both kinetics and film formation quality, thereby resulting in slight lithium plating on the convex surface at the corner, and in turn, deteriorating the hot-oven safety performance and cycle performance.

As can be seen from Table 4, by further adding a second lithium salt in the electrolytic solution, the corrosion of the aluminum foil can be further suppressed, and the cycle life of the lithium-ion battery can be increased. In addition, as can be seen from Table 4, by further adding additives (that is, $LiSO_3F$ and/or $LiPO_2F_2$) in the electrolytic solution, the high-temperature cycle performance can be further improved.

What is claimed is:

1. A lithium-ion battery, comprising: an electrode assembly and an electrolytic solution, wherein
the electrode assembly comprises a positive electrode plate and a negative electrode plate that are wound together, and a separator located between the positive electrode plate and the negative electrode plate, the negative electrode plate comprises a negative current collector and a negative material layer disposed on at least one surface of the negative current collector, and the positive electrode plate comprises a positive current collector and a positive material layer disposed on at least one surface of the positive current collector;
the positive current collector comprises a support layer and a metallic conductive layer, and the metallic conductive layer is disposed on at least one of two surfaces of the support layer;
the electrolytic solution contains a first lithium salt $Li_xR_1(SO_2N)_xSO_2R_2$, wherein $R_1$ and $R_2$ each independently represent an alkyl with 1 to 20 fluorine atoms or carbon atoms, or a fluoroalkyl with 1 to 20 carbon atoms, or a fluoroalkoxyl with 1 to 20 carbon atoms, and x is an integer of 1, 2, or 3;
the lithium-ion battery satisfies the following condition:

$$0.6 \leq \alpha \leq 0.9, \text{ and } 4 \leq w \times \alpha/\beta1 \leq 25,$$

wherein, $\alpha = La/Lc$, La is an arc length of a convex surface of the negative current collector corresponding to a concave surface of an innermost first circle of positive electrode in a jelly-roll structure of the electrode assembly, Lc is an arc length of a concave surface of an innermost first circle of positive current collector in the jelly-roll structure of the electrode assembly, and La and Lc are measured in mm; w is a percent of the first lithium salt $Li_xR_1(SO_2N)_xSO_2R_2$ by mass in the electrolytic solution; and $\beta1$ is a thickness of the metallic conductive layer, measured in μm.

2. The lithium-ion battery according to claim 1, wherein the lithium-ion battery satisfies the following condition:

$$8.7 \leq w \times \alpha/\beta1 \leq 17.$$

3. The lithium-ion battery according to claim 1, wherein $$0.52 \leq \beta1 \leq 2.4.$$

4. The lithium-ion battery according to claim 1, wherein $$5 \leq w \leq 30.$$

5. The lithium-ion battery according to claim 1, wherein the metallic conductive layer is disposed on both surfaces of the support layer.

6. The lithium-ion battery according to claim 1, wherein the electrolytic solution further contains a second lithium salt, and the second lithium salt is at least one selected from $LiPF_6$, $LiAsF_6$, or $LiBF_4$.

7. The lithium-ion battery according to claim 6, wherein based on a total mass of the electrolytic solution, a mass percent of the second lithium salt is less than or equal to 10%.

8. The lithium-ion battery according to claim 1, wherein the electrolytic solution further contains an additive, and the additive is at least one selected from fluorosulfonate, difluorooxalate borate, difluorophosphate, difluorobisoxalate, tris(trimethylsilyl)phosphate, or tris(trimethylsilyl)phosphite.

9. The lithium-ion battery according to claim 8, wherein based on a total mass of the electrolytic solution, a mass percent of the additive is less than or equal to 3%.

10. A battery module,
comprising the lithium-ion battery according to claim 1.

11. A battery pack,
comprising at least one of the lithium-ion battery according to the battery module according to claim 10.

12. An electrical device,
comprising the battery pack according to claim 11.

* * * * *